Patented Mar. 1, 1938

2,109,663

UNITED STATES PATENT OFFICE 2,109,663

MANUFACTURE OF RUBBER ASPHALTIC COMPOUNDS AND METHOD OF APPLYING SAME

George Parry Davis, Bondi Beach, near Sydney, New South Wales, Australia

No Drawing. Application July 13, 1936, Serial No. 90,386. In Australia July 13, 1935

5 Claims. (Cl. 134—17)

This invention relates to the manufacture of compounds of rubber and asphalt with other materials and method of applying same.

Compounds according to the invention may comprise (a) a straight emulsion; (b) a reversed emulsion; or (c) a combination of a straight emulsion with a reversed emulsion.

In the manufacture of said emulsions any rubber latex emulsion or vulcanized rubber latex emulsion of natural or synthetic origin can be utilized, and similarly any asphaltic commercial straight emulsion.

For binders, fillers, or aggregates for the straight emulsion any of the following materials or the like can be used:—Cement, sand, woodwool, burlap, sawdust, kaolin, clay, asbestos, marble dust, feldspar, cornish stone, pumice, bluemetal dust, black soil or dirty ballast and loamy soil, gypsum, coke, powdered limestone.

Where it is desired to add binders, fillers or aggregates to the straight emulsion it is always necessary to add a proportion of water to make either a slurry or a mortar from the said emulsion for use.

The straight emulsion compound in every case contains a proportion of keratinous solution, such as alkaline hydrosol of leather waste (whether tanned or untanned), or of wool, or of feathers. The admixture of the keratinous solution in the said straight emulsion compound retards the breaking thereof, and allows the compound to be readily used under control.

Said straight emulsion is compounded by mixing together the asphaltic emulsion, the rubber latex emulsion, and the keratinous solution, whereby the constituents thereof will be incorporated.

In manufacturing the reversed emulsion said straight emulsion has added thereto by stirring a rubber asphalt gelling solvent such as mineral turps (olefinic terpene derived from petroleum oil or the products of the destructive distillation of wood, coal etc.), or petrol, or mineral crude oil, or a mixture of these. Upon standing for a short period the admixture mentioned results in a highly viscous tacky and adhesive reversed emulsion.

For the manufacture of the combined straight emulsion with a reversed emulsion said separate emulsions are added together and the contents thereof incorporated by stirring. By such incorporation the resultant combined emulsion is broken and its water content is freed therefrom.

For use the straight emulsion product with or without fillers may be applied singly or it may be applied in association with the reversed emulsion product. Some applications of the emulsion products for industrial and other purposes are given below:—

The straight emulsion may be applied for adherence and superficial penetration as well as waterproofing into wet or damp cement or concrete or other porous foundations or surfaces by which the emulsion is allowed to superficially penetrate the said foundations or surfaces. Such superficial penetration is due to a similar surface tension of the wetted face mentioned, the interior suction of the foundations or surface drawing in the emulsion and the water simultaneously. Through such penetration and setting in the foundation or surface the emulsion is broken by the lime in the cement. Subsequently and before drying the emulsion treated exterior surface or foundation can be treated by dusting such surface with a dry mortar mix whereby the pores thereof will become sealed, and a smooth, hard, waterproof face is obtained; prior to such dusting operation the said face can be conserved and thickened by applying thereto if desired by sprinkling thereon a wet mortar mix which can be finished by trowelling or the like. Further, said straight emulsion can after the addition of necessary fillers, binders or aggregates and made into slurry or mortar be shaped or moulded into block or other suitable form by any well known hand or hydraulic pressure means or method, or such slurry may be spun into pipes or the like, or such slurry or mortar may be used for the surfacing of tennis courts or for use as packing for tram rails. Again, such straight emulsion is capable of use by sprinkling and raking when it is diluted by water for earth surfaces for farm paths, country roads, or the like.

As examples of some of the useful applications of the reversed emulsion the following are given:—

Said reversed emulsion may be utilized as an adhesive and superficial penetrative as well as a waterproofing material when applied to dry cement, or concrete, or other porous foundations or surfaces. The superficial penetration and suction qualities of the said emulsion are of similar type to but of lesser degree than those before described for the straight emulsion. Further, the reversed emulsion can be utilized in association with the straight emulsion, the latter being first applied to the surface or foundation to be treated, and the reversed emulsion being applied to the exposed face of said treated surface or foundation.

Examples of some of the useful applications of the combined straight emulsion with the reversed emulsion are given below:—

Upon drying by any known means or method the said combined emulsion gel is dissolved by any known solvent to form paints, or waterproofing or plastic or like materials, or as a substitute for asphalt in the manufacture of roofing felts or plastic facings or the like.

One example is given below of approximate proportions of materials for the manufacture of the compound straight emulsion.

Impregnating mixture:—(Compound straight emulsion)

| | Volumes |
|---|---|
| Alkaline hydrosol of leather | 1 |
| Rubber latex | 1 |
| Asphaltic commercial straight emulsion | 1 or 2 |

To such impregnating mixture can be added a sufficiency of water and necessary fillers or aggregates to produce any desired dry solid content (say 20%) of combined rubber and asphalt in the final mixed dry product for use.

When the above compound of materials is to be used for floors, roofs, pavement or road surfaces the proportions of materials may be as follows:—

76 vols. of impregnating mixture and added water of 3½ lbs. (per gallon) dry solid content of rubber and asphalt 71 vols. of fillers—say composition

| | |
|---|---|
| Finely sifted blue metal dust | 55 |
| Finely sifted gypsum | 5 |
| Finely sifted coke | 40 |
| | 100 |

Another example of such compound of materials utilizable for country road surfaces is given as follows:—

| | Volumes |
|---|---|
| Impregnating mixture of 5 lbs. per gallon dry solid content of rubber and asphalt | 10 |
| Powdered limestone | 11 |
| Black soil or dirty ballast and loamy soil | 79 |

As an example of such compound of materials for use as a silencer packing for tram rails the following is given:—

| | Volumes |
|---|---|
| Impregnating mixture of 5 lbs. per gallon dry solid content of rubber and asphalt | 22 |
| Sawdust | 8 |
| Fine sand | 9 |
| Powdered limestone | 22 |

An example of approximate proportions of materials for the manufacture of the reversed emulsion is given below:—

| | Volumes |
|---|---|
| (1) Alkaline hydrosol of leather | 1 |
| (2) Rubber latex | 1 |
| (3) Asphaltic commercial straight emulsion | 1 or 2 |

The above can be converted into a reversed emulsion by stirring into it:—

10/15% its volume of rubber asphalt gelling solvent or sufficient to form it into a gel of the desired viscosity.

For a combined straight emulsion with a reversed emulsion an example of appropriate proportions of materials for the manufacture thereof is given below:—

| | Volumes |
|---|---|
| Straight emulsion (as above) | 1 |
| Reversed emulsion (as above) | 2 |

The alkaline hydrosol or keratinous solution herein referred to is obtainable by macerating or digesting the keratinous material such as oak tanned leather waste with washing soda or caustic soda or potash or such as wool or feathers with washing soda or caustic soda or potash. Boiling facilitates and quickens the operation of obtaining the necessary extract or solution.

The following are given as examples of materials which can be utilized in the preparation of the said keratinous solution.

1. Oak tanned powder leather waste____lbs__ 2½
   Washing soda or caustic soda or potash
   lb__ ½
   Water_____gallons__ 5
2. Low grade wool (crutchings or dage) _lbs__ 2½
   Washing soda or caustic soda or potash
   lb__ ½
   Water_____gallons__ 5

Control of aqueous slurries of compounded straight rubber emulsion and asphaltic straight emulsion as herein described is effected by the addition of the keratinous hydrosol solution to preserve such slurries in liquid form.

Breaking or curdling of said slurries to convert them into slow setting controllable and workable mortar is effected by adding to said slurries when they are to be used a permanent water hardener such as lime or other suitable permanent water hardener.

What I claim as my invention and desire to secure by Letters Patent is:—

1. A rubber-asphalt composition, comprising rubber and asphalt emulsified with an aqueous keratinous hydrosol solution obtained by alkaline hydrolysis.

2. A rubber-asphalt emulsion capable of being coagulated by a water-hardening reagent, comprising a dispersion of rubber and asphalt in an aqueous keratinous hydrosol solution obtained by alkaline hydrolysis as the continuous phase.

3. A rubber - asphalt emulsion, comprising mineral oil, asphalt, rubber and an aqueous solution of keratinous hydrosol, the oil constituting the continuous phase.

4. The method of making rubber-asphalt compositions, comprising dispersing rubber and asphalt in an aqueous keratinous hydrosol solution as the continuous phase, adding a mineral oil and agitating to produce an emulsion in which the oil is the continuous phase.

5. The method of making rubber-asphalt compositions, comprising mixing a rubber, asphalt aqueous alkaline keratinous hydrosol, and water emulsion having water as the continuous phase with a rubber, asphalt, water and oil emulsion having the oil as the continuous phase, and agitating the mixture to break the resultant combined emulsion and liberate the greater part of the water.

GEORGE PARRY DAVIS.